Figure 1:
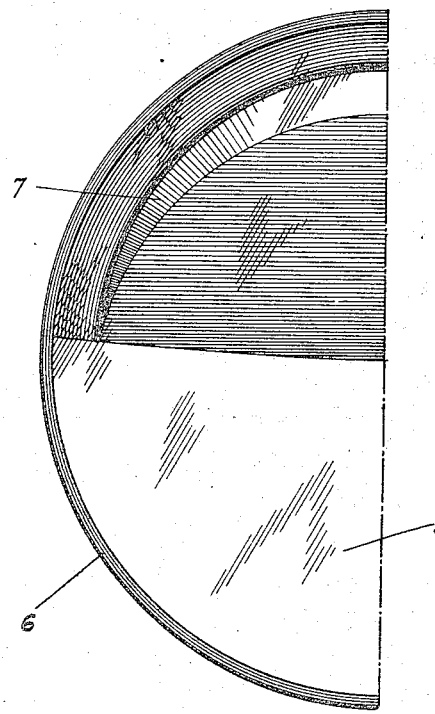

May 1, 1923.

R. H. BARZ

HEADLIGHT LENS

Filed May 15, 1922

INVENTOR.
Robert H. Barz
BY
ATTORNEY

Patented May 1, 1923.

1,453,539

UNITED STATES PATENT OFFICE.

ROBERT H. BARZ, OF STOCKTON, CALIFORNIA.

HEADLIGHT LENS.

Application filed May 15, 1922. Serial No. 560,886.

*To all whom it may concern:*

Be it known that I, ROBERT H. BARZ, a citizen of the United States, residing at Stockton, county of San Joaquin, State of California, have invented certain new and useful Improvements in Headlight Lenses; and I do declare the following to be a full, clear, and exact description of the same, reference being had to the accompanying drawings, and to the characters of reference marked thereon, which form a part of this application.

This invention relates to improvements in lenses for use with headlights, and particularly those of automobiles, in which the combination of a light strong enough for driving purposes, and yet one which will not glare into the eyes of oncoming drivers, is highly desirable, and in most States legally necessary, especially as to the last named feature.

The principal object of my invention therefore is to provide a combined lens and light reflecting structure so arranged with regard to the lamp and the main reflector that all the rays of the lamp will be utilized in throwing light onto the ground where it is needed, and none will be thrown upwardly from the reflector in a manner to glare into the eyes of approaching drivers.

Another object is to provide a device which while intended to be mounted as a unit with a plain-glass lens, may be attached to any such lens, without necessitating the replacement of the entire structure, in the event that the lens should be broken, as frequently happens.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 2:
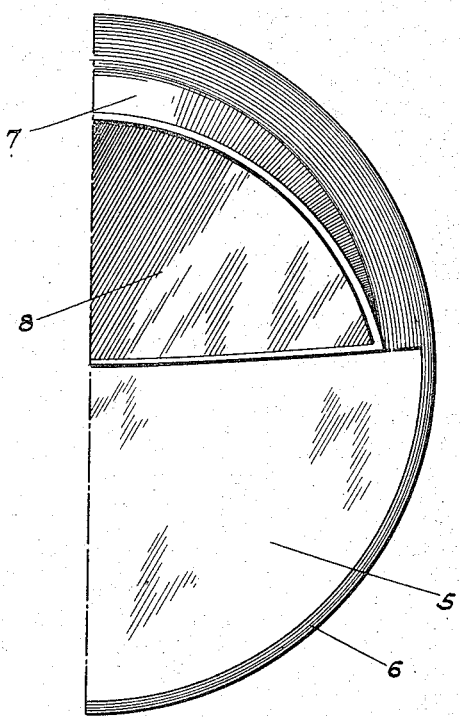
Figure 3:
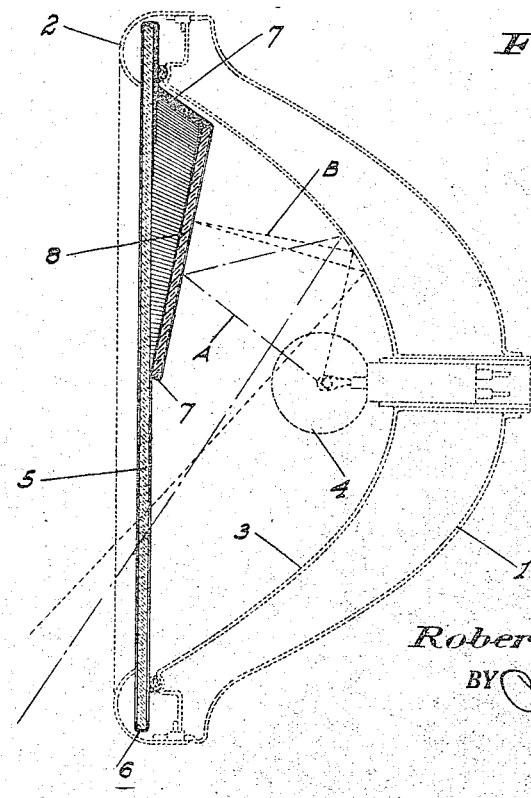

Fig. 1 is a partial front view of the lens.
Fig. 2 is a partial rear view of the same.
Fig. 3 is a vertical section of the lens, showing it installed in an ordinary headlight.

Referring now more particularly to the characters of reference on the drawings, the numeral 1 denotes the headlight casing, provided with the usual front-end rim 2, parabolic reflector 3, and lamp 4 mounted centrally of the reflector.

The numeral 5 denotes the outer lens, of any ordinary type, which is held in place in the rim 2 in the usual manner.

Crimped about the periphery of the lens is a metal beading 6, which supports a metal hood or frame 7 which projects inwardly of the reflector for the upper half thereof. In this frame is mounted a glass mirror 8, the reflecting surface thereof facing toward the reflector, while the opposite face is backed by the metal of the frame, which is preferably colored green, since this face will be visible through the lens 5.

The mirror covers the upper half of the lens, its lower edge being substantially on a line with the center line of the lamp 4, and it is positioned so as to include an angle of between 10 and 15 degrees with the lens, at the lower edge of the mirror.

By means of this device, rays thrown upwardly from the lamp strike the mirror, and reflected back against the reflector 3, and from there are diverted down onto the ground, as shown at A in Fig. 3. Similarly, rays thrown by the lamp onto the reflector at such points as would cause them when reflected to be thrown upwardly above the central plane of the lamp, are caught by the mirror, reflected thence onto the reflector, and then thrown by the latter in a downward direction, as shown at B in Fig. 3. The mirror is preferably of glass, but highly polished metal may be used if a cheaper and lighter structure is desired.

From the foregoing description it will be readily seen that I have produced such a structure as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent, is:—

A non-glare attachment for automobile headlight lenses comprising a metal beading adapted to be placed about the periphery of the lens, a metallic and substantially semi-circular hood mounted on the upper half of the beading and projecting inwardly thereof, said hood following the contour of the reflector of the headlight and the inner edge thereof sloping inwardly from its lower edges toward the top, and a reflector mounted within the hood along the inner edge thereof, the reflecting surface facing inwardly of the headlight.

In testimony whereof I affix my signature.

ROBERT H. BARZ.